(12) United States Patent
Morita et al.

(10) Patent No.: US 9,527,497 B2
(45) Date of Patent: Dec. 27, 2016

(54) CONTROL DEVICE FOR HYBRID VEHICLE (71) Applicant: TOYOTA JIDOSHA KABUSHIKI KAISHA, Toyota-shi, Aichi-ken (JP)

(72) Inventors: Hiroki Morita, Hiratsuka (JP); Yoshihito Kanno, Numazu (JP); Gohki Kinoshita, Isehara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/894,630

(22) PCT Filed: May 31, 2013

(86) PCT No.: PCT/JP2013/065254
§ 371 (c)(1),
(2) Date: Nov. 30, 2015

(87) PCT Pub. No.: WO2014/192151
PCT Pub. Date: Dec. 4, 2014

(65) Prior Publication Data
US 2016/0107636 A1  Apr. 21, 2016

(51) Int. Cl.
*B60W 30/16*  (2012.01)
*B60W 10/16*  (2012.01)
*B60K 6/445*  (2007.10)
*B60W 10/06*  (2006.01)
*B60W 10/08*  (2006.01)
(Continued)

(52) U.S. Cl.
CPC .............. *B60W 10/16* (2013.01); *B60K 6/445* (2013.01); *B60W 10/06* (2013.01); *B60W 10/08* (2013.01); *B60W 20/00* (2013.01); *B60W 20/10* (2013.01); *B60W 30/192* (2013.01); *B60W 2710/0622* (2013.01); *B60W 2710/0666* (2013.01); *B60W 2710/083* (2013.01); *Y02T 10/6239* (2013.01); *Y02T 10/6286* (2013.01); *Y10S 903/905* (2013.01); *Y10S 903/93* (2013.01)

(58) Field of Classification Search
CPC ................... B60W 30/192; B60W 2710/0622; B60W 20/10; B60W 10/06; B60W 10/08; B60W 20/16; B60W 2710/0666; B60W 2710/083; B60W 20/00; B60K 6/445; Y02T 10/6286; Y02T 10/6239; Y10S 903/905; Y10S 903/93
See application file for complete search history.

(56) References Cited

U.S. PATENT DOCUMENTS

2010/0162686 A1* 7/2010 Miyashita ................ B60K 6/24
60/274

FOREIGN PATENT DOCUMENTS

| JP | 2005-069029 A | 3/2005 |
| JP | 2005-163667 A | 6/2005 |
| JP | 2006-248519 A | 9/2006 |

(Continued)

*Primary Examiner* — Yuen Wong
(74) *Attorney, Agent, or Firm* — Andrews Kurth Kenyon LLP (57) ABSTRACT

A control device according to the invention moves an operation point of an internal combustion engine such that a distribution of engine torque with respect to required torque is reduced and then carries out air-fuel ratio control for reducing an air-fuel ratio of the internal combustion engine in a case where an operation mode of the internal combustion engine should be switched from a lean combustion mode to a stoichiometric combustion mode.

4 Claims, 9 Drawing Sheets

(51) Int. Cl.
  *B60W 30/192* (2012.01)
  *B60W 20/00* (2016.01)

(56) References Cited

FOREIGN PATENT DOCUMENTS

JP  2008-068802 A  3/2008

* cited by examiner

CONTROL DEVICE FOR HYBRID VEHICLE

CROSS-REFERENCE TO RELATED APPLICATION

This is a national phase application based on the PCT International Patent Application No. PCT/JP2013/065254 filed May 31, 2013, the entire contents of which are incorporated herein by reference.

TECHNICAL FIELD

The invention relates to a control device that is applied to a hybrid vehicle which is provided with an internal combustion engine capable of switching air-fuel ratios.

BACKGROUND ART

A lean burn engine that is capable of carrying out a lean combustion mode in which a target air-fuel ratio is set on a lean side in comparison to a theoretical air-fuel ratio has been known. During lean combustion, the lean burn engine switches an air-fuel ratio to the theoretical air-fuel ratio on a rich side in comparison to the target air-fuel ratio of the lean combustion or a target air-fuel ratio therearound and carries out stoichiometric combustion in the event of, for example, acceleration, when engine torque falls short. The lean burn engine is equipped with an occlusion reduction-type NOx catalyst, and thus a rich spike is carried out so that the air-fuel ratio is temporarily switched toward the rich side and nitrogen oxide that the NOx catalyst occludes is purified. In a case where the operation mode is switched from the lean combustion mode to the stoichiometric combustion mode or the non-lean combustion mode in which the rich spike is carried out, the air-fuel ratio is reduced due to an increase in fuel quantity. Then, the engine torque increases.

The hybrid vehicle that is equipped with the lean burn engine can absorb the increase in the engine torque resulting from the switching of the operation modes through regenerative control in a motor generator. However, regeneratable torque regeneratable by the motor generator is limited, and thus the increase in the engine torque cannot be fully absorbed by the regeneration of the motor generator in some cases. For example, a control device for a hybrid vehicle in which surplus torque that exceeds required torque is absorbed by regeneration of a motor generator while an increase in engine torque that occurs during a rich spike is suppressed to the minimum by control for reducing engine power such as ignition retarding and EGR amount increase has been known (PTL 1). This control device also performs enhancement of charging capacity of a battery, by lowering an electric power storage rate of the battery, relaxing an input limit of the battery, and the like, in preparation for regenerative control by the motor generator. PTL 2 is also included in the patent literature associated with the invention.

CITATION LIST

Patent Literature

PTL 1: Japanese Patent Application Publication No. 2005-163667
PTL 2: Japanese Patent Application Publication No. 2005-69029

SUMMARY OF THE INVENTION

As disclosed in PTL 1, fuel economy deteriorates when ignition retarding is carried out in an internal combustion engine so that an increase in engine torque is suppressed. EGR amount increase, which is poor in response, is unlikely to be suitable for torque fluctuation resulting from a rich spike. Even when charging capacity of a battery is enhanced, regenerative capacity falls short insofar as a motor generator has a low level of rated torque. Accordingly, it cannot be ensured that surplus torque is absorbed sufficiently.

An object of the invention is to provide a control device for a hybrid vehicle that is capable of suppressing a shock to a vehicle attributable to switching from a lean combustion mode to a non-lean combustion mode.

A control device for a hybrid vehicle according to a first aspect of the invention is a control device for a hybrid vehicle applied to a hybrid vehicle having an internal combustion engine and at least one motor generator as power sources for traveling, the internal combustion engine capable of switching operation modes between a lean combustion mode and a non-lean combustion mode set to an air-fuel ratio on a rich side in comparison to the lean combustion mode, the control device including torque control means capable of changing a distribution of engine torque of the internal combustion engine and motor torque of the motor generator with respect to required torque and air-fuel ratio control means for carrying out air-fuel ratio control for reducing the air-fuel ratio of the internal combustion engine in a case where the operation mode is switched from the lean combustion mode to the non-lean combustion mode, in which the air-fuel ratio control means carries out the air-fuel ratio control after the torque control means reduces the distribution of the engine torque with respect to the required torque in a case where the operation mode should be switched from the lean combustion mode to the non-lean combustion mode.

According to the control device of the first aspect, the operation mode is switched from the lean combustion mode to the non-lean combustion mode in a state where the distribution of the engine torque with respect to the required torque is reduced. Accordingly, an increase in the engine torque can be suppressed in comparison to a case where the operation mode is switched from the lean combustion mode to the non-lean combustion mode without the distribution of the engine torque with respect to the required torque being reduced. Accordingly, surplus torque generated as a result of the switching of the operation modes can be sufficiently absorbed by the motor generator. As a result, a shock to the vehicle resulting from the switching of the operation modes can be suppressed.

A control device for a hybrid vehicle according to a second aspect of the invention is a control device for a hybrid vehicle applied to a hybrid vehicle having an internal combustion engine and at least one motor generator as power sources for traveling, the internal combustion engine capable of carrying out a lean combustion mode and capable of carrying out a rich spike for temporarily changing an air-fuel ratio into an air-fuel ratio on a rich side when the lean combustion mode is carried out, the control device including torque control means capable of changing a distribution of engine torque of the internal combustion engine and motor torque of the motor generator with respect to required torque and air-fuel ratio control means for carrying out air-fuel ratio switching control for reducing the air-fuel ratio of the internal combustion engine in a case where the rich spike is carried out, in which the air-fuel ratio control means carries out the air-fuel ratio switching control after the torque control means reduces the distribution of the engine torque with respect to the required torque in a case where the rich spike should be carried out.

According to the control device of the second aspect, the rich spike is carried out in a state where the distribution of the engine torque with respect to the required torque is reduced. Accordingly, an increase in the engine torque can be suppressed in comparison to a case where the rich spike is carried out without the distribution of the engine torque with respect to the required torque being reduced. Accordingly, surplus torque generated as a result of the rich spike can be sufficiently absorbed by the motor generator. As a result, a shock to the vehicle resulting from the rich spike can be suppressed.

In the control device according to the first aspect of the invention, the torque control means may reduce the distribution of the engine torque with respect to the required torque by calculating the engine torque based on a first target air-fuel ratio in the lean combustion mode, a second target air-fuel ratio in the non-lean combustion mode, the required torque, and regeneratable torque regeneratable in the motor generator. According to this aspect, the distribution of the engine torque with respect to the required torque is reduced by the engine torque calculated based on the regeneratable torque and the like, and thus the surplus torque resulting from the switching of the operation modes can be effectively absorbed through regeneration of the motor generator.

In the control device according to the second aspect of the invention, the torque control means may reduce the distribution of the engine torque with respect to the required torque by calculating the engine torque based on a first target air-fuel ratio in the lean combustion mode, a second target air-fuel ratio during the rich spike, the required torque, and regeneratable torque regeneratable in the motor generator. According to this aspect, the distribution of the engine torque with respect to the required torque is reduced by the engine torque calculated based on the regeneratable torque and the like, and thus the surplus torque resulting from the rich spike can be effectively absorbed through regeneration of the motor generator.

Each of these aspects may further include torque changing means for changing the engine torque into a lower value than the engine torque calculated by the torque control means in a case where a region where thermal efficiency of the internal combustion engine is improved is present on a low torque side in comparison to the calculated engine torque. In this case, the surplus torque resulting from the switching of the operation modes or the rich spike can be reliably absorbed while deterioration in fuel economy of the internal combustion engine is suppressed.

In the control device according to the first aspect or the second aspect of the invention, the torque control means may reduce the distribution of the engine torque with respect to the required torque in a state where the internal combustion engine is maintained at equal power. According to this aspect, the power of the internal combustion engine can be maintained during the reduction in the distribution of the engine torque with respect to the required torque, and thus excess and deficiency of the power of the internal combustion engine can be avoided.

MODES FOR CARRYING OUT THE INVENTION (First Embodiment)

Figure 1:
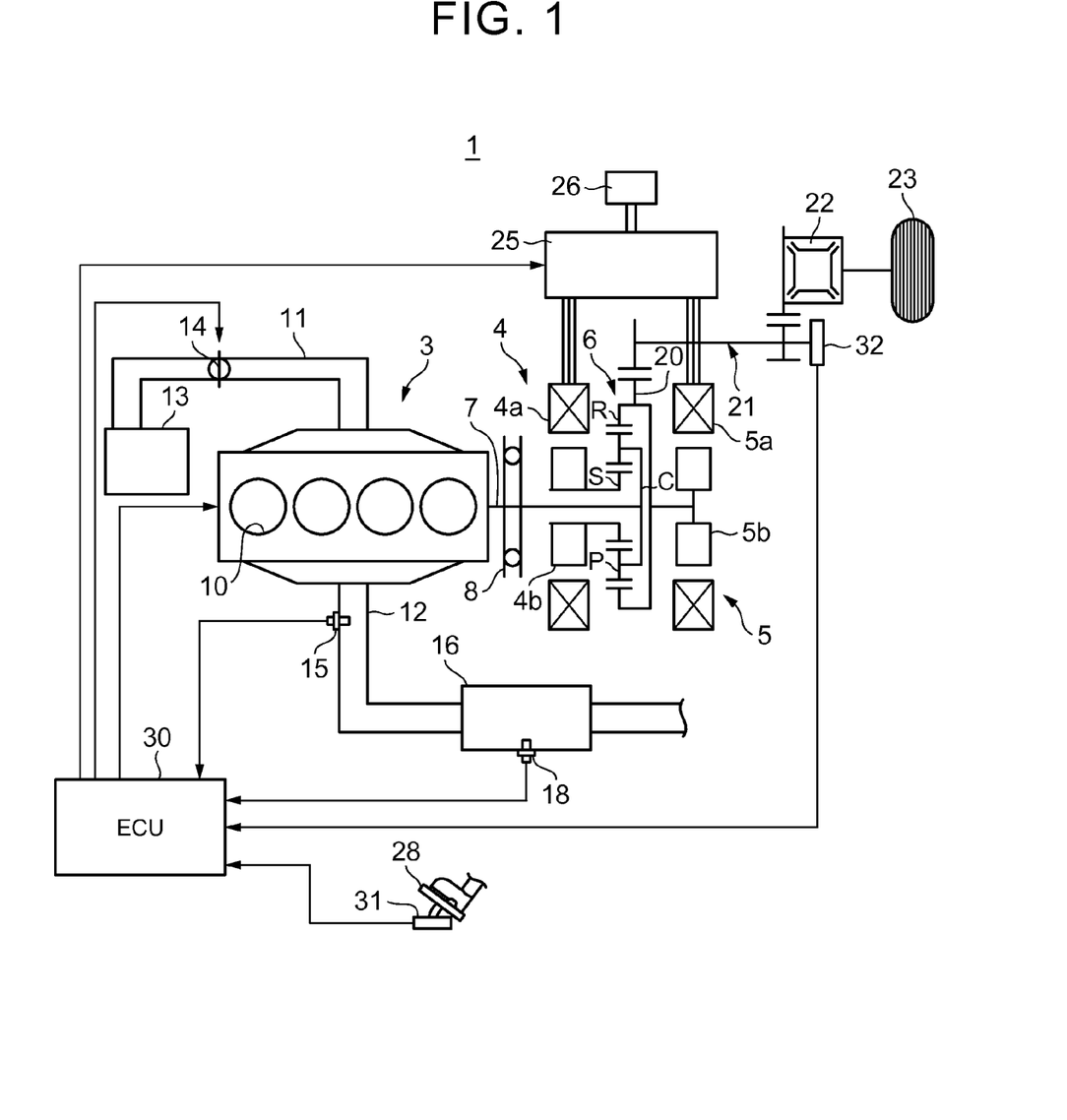
FIG. 1 is a diagram illustrating an overall configuration of a vehicle to which a control device according to an embodiment of the invention is applied.

As illustrated in FIG. 1, a vehicle 1 is configured as a hybrid vehicle in which a plurality of power sources are combined with each other. The vehicle 1 is provided with an internal combustion engine 3 and two motor generators 4, 5 as the power sources for traveling. The internal combustion engine 3 is a series four-cylinder internal combustion engine that is provided with four cylinders 10. The internal combustion engine 3 is configured as a so-called lean burn engine. The internal combustion engine 3 can switch operation modes between a lean combustion mode and a stoichiometric combustion mode. The lean combustion mode is an operation mode for carrying out lean combustion, in which an air-fuel ratio set on a lean side in comparison to a theoretical air-fuel ratio is a target. The stoichiometric combustion mode is an operation mode for carrying out stoichiometric combustion, in which the theoretical air-fuel ratio on a rich side in comparison to the air-fuel ratio of the lean combustion mode or an air-fuel ratio therearound is a target. The stoichiometric combustion mode has the air-fuel ratio on the rich side in comparison to the air-fuel ratio of the lean combustion mode as theoretical target air-fuel ratio. Accordingly, the stoichiometric combustion mode corresponds to the non-lean combustion mode according to the invention.

An intake passage 11 and an exhaust passage 12 are connected to each of the cylinders 10 of the internal combustion engine 3. An air cleaner 13 for air filtration and a throttle valve 14 capable of air flow rate adjustment are disposed in the intake passage 11. An A/F sensor 15 that outputs a signal correlated with an air-fuel ratio (A/F) of the internal combustion engine 3 is disposed in the exhaust passage 12. In addition, a NOx catalyst 16 that purifies harmful components in exhaust gas is disposed in the exhaust passage 12. The NOx catalyst 16 is a known occlusion reduction-type NOx catalyst. A temperature sensor 18 that detects the temperature of the NOx catalyst 16 is disposed in the NOx catalyst 16.

The internal combustion engine 3 and the first motor generator 4 are connected to a power dividing mechanism 6. An output of the power dividing mechanism 6 is transmitted to an output gear 20. The output gear 20 and the second motor generator 5 are connected to each other and integrally rotate with each other. Power that is output from the output gear 20 is transmitted to a driving wheel 23 via a deceleration device 21 and a differential device 22. The first motor generator 4 has a stator 4a and a rotor 4b. The first motor generator 4 functions as a generator that generates electric power by receiving the power of the internal combustion engine 3 which is divided by the power dividing mechanism 6 and functions as an electric motor that is driven on AC electric power. Likewise, the second motor generator 5 has a stator 5a and a rotor 5b and functions as an electric motor and a generator. Each of the motor generators 4, 5 is connected to a battery 26 via a motor control device 25. The motor control device 25 converts the electric power generated by each of the motor generators 4, 5 into DC electric power and stores the DC electric power in the battery 26. In addition, the motor control device 25 converts the electric power of the battery 26 into AC electric power and supplies the AC electric power to each of the motor generators 4, 5.

The power dividing mechanism 6 is configured as a single pinion-type planetary gear mechanism. The power dividing mechanism 6 has a sun gear S, a ring gear R, and a planetary carrier C that holds a pinion P which meshes with the gears S, R to be capable of rotation and revolution. The sun gear S is connected to the stator 4a of the first motor generator 4, the ring gear R is connected to the output gear 20, and the planetary carrier C is connected to a crankshaft 7 of the internal combustion engine 3. A damper 8 is interposed between the crankshaft 7 and the planetary carrier C. The damper 8 absorbs torque fluctuation of the internal combustion engine 3.

Control of the vehicle 1 is controlled by an electronic control unit (ECU) 30. The ECU 30 performs various types of control on the internal combustion engine 3 and the motor generators 4, 5. Hereinafter, main control that is performed by the ECU 30 according to the invention will be described. The ECU 30 calculates required torque required by a driver with reference to an output signal of an accelerator opening degree sensor 31 and an output signal of a vehicle speed sensor 32, and controls the vehicle 1 while switching various modes so that system efficiency correlated with the required torque is optimized. For example, an EV mode, in which the combustion of the internal combustion engine 3 is stopped and the second motor generator 5 is driven, is selected in a low load region where the thermal efficiency of the internal combustion engine 3 is reduced. In a case where torque falls short with the internal combustion engine 3 alone, a hybrid mode, in which the second motor generator 5 as well as the internal combustion engine 3 is used as a driving source for traveling, is selected.

Figure 2:
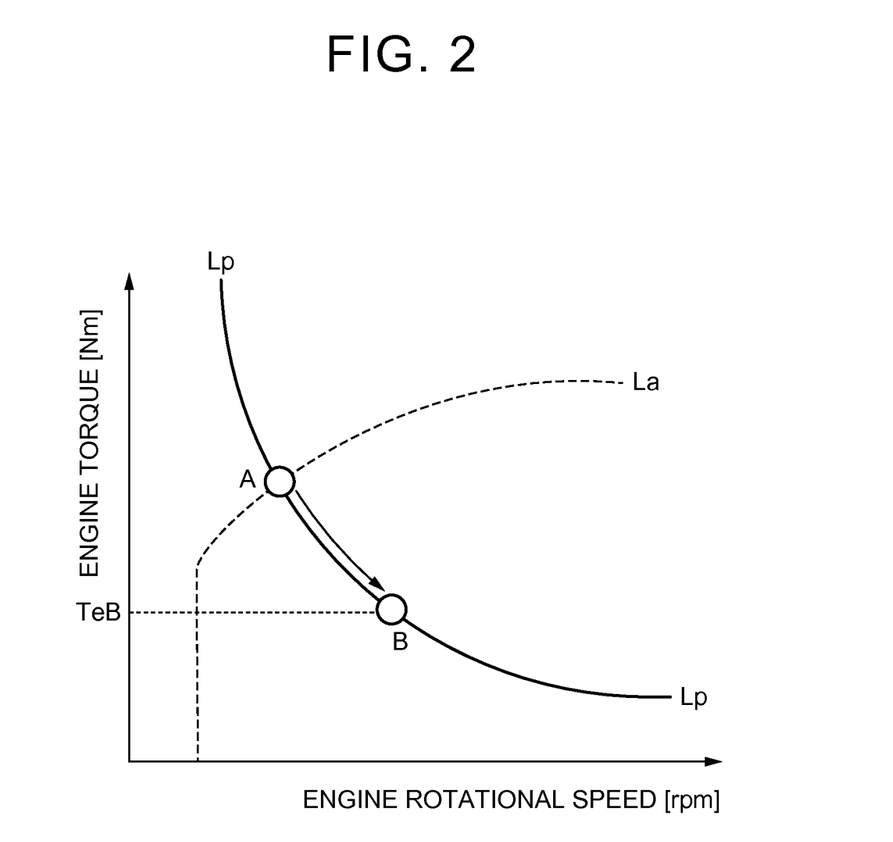
FIG. 2 is an explanatory drawing illustrating a movement of an operation point of an internal combustion engine.

In a case where the hybrid mode is selected, the required torque is output based on the addition of the engine torque of the internal combustion engine 3 to the motor torque of the second motor generator 5. In other words, the required torque Tq is defined as Tq=Te+Tm in a case where the engine torque is Te and the motor torque is Tm. The distribution of the engine torque Te and the motor torque Tm with respect to the required torque Tq changes with a change in an operation point of the internal combustion engine 3 that is defined by an engine rotational speed and the engine torque. The ECU 30 controls the operation point of the internal combustion engine 3 so that the operation point of the internal combustion engine 3 moves on a pre-set normal line La as illustrated in FIG. 2 unless a special condition is satisfied. This normal line La is determined in advance, through an experiment using simulation and an actual machine, so that the fuel efficiency of the internal combustion engine 3 can be optimized and noise can be reduced.

The ECU 30 measures the air-fuel ratio with reference to an output value of the A/F sensor 15 so as to carry out each of the lean combustion mode and the stoichiometric combustion mode and performs feedback control so that the deviation between the measured air-fuel ratio and the target air-fuel ratio in the current operation mode is reduced. Switching from the lean combustion mode to the stoichiometric combustion mode is carried out within a short period of time by a temporary increase in fuel injection quantity and in view of an intake air amount response lag. In a period when the intake air amount response lag occurs, switching from a first target air-fuel ratio $\lambda 1$ of the lean combustion mode to a target air-fuel ratio $\lambda 2$ of the stoichiometric combustion mode is performed based on an increase in fuel quantity. Accordingly, the fuel injection quantity becomes $\lambda 1/\lambda 2$ times during the switching of the air-fuel ratios, and thus the engine torque also becomes $\lambda 1/\lambda 2$ times during the switching of the air-fuel ratios. In a case where $\lambda 1$ is 22.1 and $\lambda 2$ is 14.7, for example, the engine torque becomes approximately 1.5 times during the switching of the air-fuel ratios. The vehicle 1 is subjected to a shock when the torque that is output by the output gear 20 exceeds the required torque due to an increase in the engine torque resulting from the switching of the operation modes.

This embodiment is characterized by the control that is carried out by the ECU 30 during the switching from the lean combustion mode to the stoichiometric combustion mode. Hereinafter, a comparative example will be described first for better understanding of this control. The engine torque increases as described above when the operation mode is switched from the lean combustion mode to the stoichiometric combustion mode at the operation point A illustrated in FIG. 2. In the case of the comparative example illustrated in FIG. 3, the distribution of motor torque TmA and engine torque TeA with respect to the required torque Tq is as illustrated in the drawing. In a case where the engine torque TeA is increased to engine torque TeA' in this state as a result of the switching of the operation modes, regenerative control is performed in the second motor generator 5 so that surplus torque is reduced. As a result of the regenerative control, part of the engine torque TeA' is canceled out by regenerative torque TmA'. In other words, part of the engine torque TeA' is absorbed through the regenerative control in the second motor generator 5. The regenerative torque TmA' of the second motor generator 5 has a limit. In a case where this limit is regeneratable torque Tlim, the regeneratable torque Tlim is determined based on conditions such as an upper limit of an electric power storage rate of the battery 26, an input limit of the battery 26, and the minimum torque of the second motor generator 5, and changes depending on states of these conditions. In the case of the comparative example illustrated in FIG. 3, the part that exceeds the required torque Tq cannot be fully canceled out even when the regenerative control is performed at the maximum regenerative torque at which the regenerative torque TmA' corresponds to the regeneratable torque Tlim. Accordingly, the surplus torque Ts is generated and the vehicle 1 is subjected to the shock.

Figure 3:
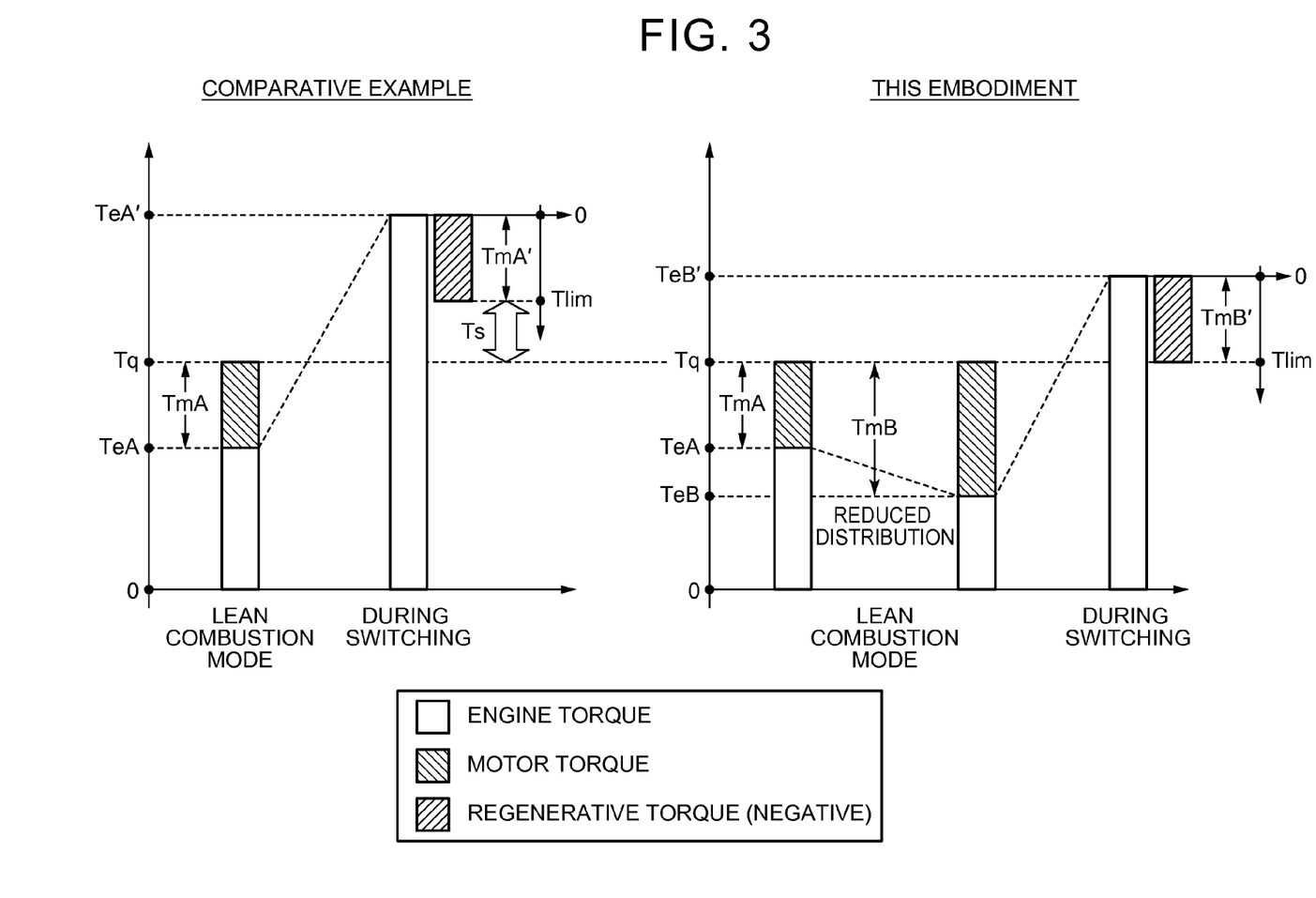
FIG. 3 is an explanatory drawing illustrating control content.

In this control, in contrast, the operation point of the internal combustion engine 3 is changed from A to B on a low torque side along an equal power line Lp as illustrated in FIG. 2, the distribution of the engine torque Te with respect to the required torque Tq is reduced, and then the switching of the air-fuel ratios is carried out in a case where the operation mode is switched from the lean combustion mode to the stoichiometric combustion mode. Then, engine torque TeB increases to engine torque TeB' as illustrated in FIG. 3 but the increase can be suppressed in comparison to the comparative example. Accordingly, the part of the post-increase engine torque TeB' that exceeds the required torque Tq can be fully absorbed through the regenerative control in the second motor generator 5. Accordingly, the surplus torque Ts as in the comparative example is not generated and the shock to the vehicle 1 can be suppressed.

As illustrated in FIG. 3, the following Equation 1 may be satisfied during the switching from the lean combustion mode to the stoichiometric combustion mode for the surplus torque Ts not to be generated.

$$Tq=TeB+TmB=TeB'+TmB' \qquad 1$$

As described above, the engine torque becomes $\lambda 1/\lambda 2$ times as a result of the switching from the lean combustion mode that has the first target air-fuel ratio $\lambda 1$ to the stoichiometric combustion mode that has the second target air-fuel ratio $\lambda 2$. Accordingly, Equation 2 is satisfied with regard to the engine torque during the switching of the operation modes.

$$TeB'=\lambda 1/\lambda 2 * TeB \qquad 2$$

Regenerative torque TmB' is equal to the regeneratable torque Tlim, and Equation 3 is satisfied.

$$TmB'=Tlim \qquad 3$$

Equation 4 is obtained when Equation 2 and Equation 3 are substituted with Equation 1 and the result is organized with regard to TeB.

$$TeB=\lambda 2/\lambda 1 * (Tq-Tlim) \qquad 4$$

Accordingly, in a case where the operation mode should be switched from the lean combustion mode to the stoichiometric combustion mode, (1) the engine torque TeB is calculated based on Equation 4 and the distribution of the engine torque with respect to the required torque is reduced by the operation point of the internal combustion engine 3 being moved to the operation point of the engine torque TeB, and then (2) air-fuel ratio switching control for reducing the air-fuel ratio is carried out. Then, an increase in the engine torque can be fully absorbed through the regenerative control in the second motor generator 5. In other words, the generation of the surplus torque resulting from the switching of the operation modes can be avoided.

Figure 4:
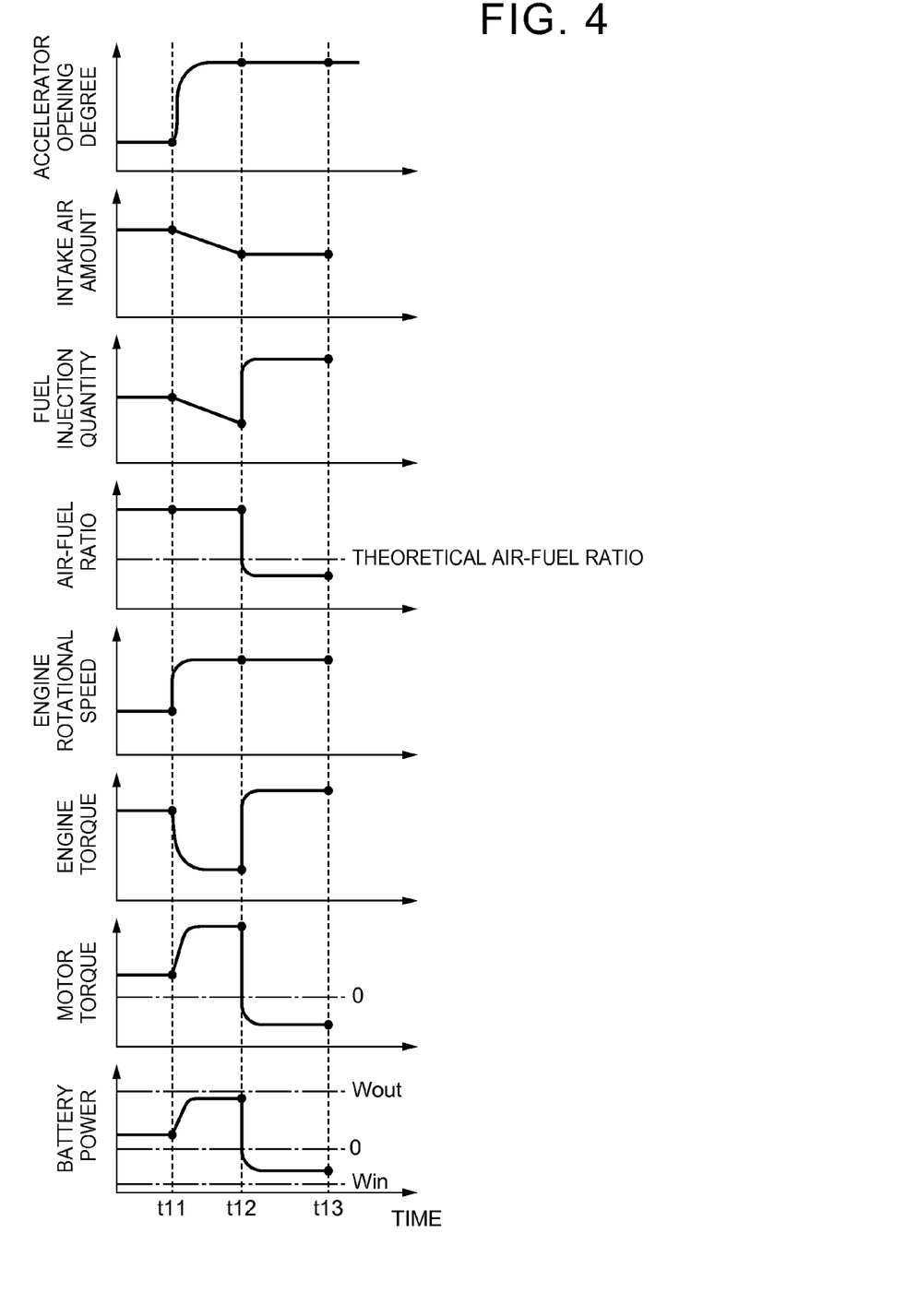
FIG. 4 is a time chart pertaining to a case where control according to the first embodiment is carried out.

A time-dependent change in each parameter of the vehicle 1 pertaining to a case where this control is carried out is as follows. In a case where an accelerator pedal 28 is depressed at a depression rate exceeding a predetermined depression rate and by a depression amount exceeding a predetermined depression amount by the driver at time t11 while the internal combustion engine 3 is in operation in the lean combustion mode as illustrated in FIG. 4, it is determined that that operation mode of the internal combustion engine 3 should be switched from the lean combustion mode to the stoichiometric combustion mode due to a reason such as output torque shortage. In a case where this determination is made, the engine torque for reducing the distribution of the engine torque with respect to the required torque is calculated based on Equation 4 above. Then, the operation point of the internal combustion engine 3 is moved from the operation point pertaining to time t11 to the operation point of the engine torque calculated based on Equation 4 along the equal power line Lp (FIG. 2), that is, while engine power is being maintained. Since the operation point of the internal combustion engine 3 is moved along the equal power line Lp, the engine rotational speed changes toward a high rotation side and the engine torque changes toward the low torque side from time t11. When the operation point changes as described above, each of an intake air amount and the fuel injection quantity is reduced. In this case, the motor torque increases to be balanced with the reduction in the distribution of the engine torque with respect to the required torque. Electric power consumption increases as a result of the increase in the motor torque, and thus the input and output of the battery (battery power) increases within the range of an output limit Wout.

Upon the internal combustion engine 3 reaching the operation point of the engine torque calculated based on Equation 4 at time t12, the air-fuel ratio switching control for reducing the air-fuel ratio based on an increase in the fuel injection quantity is carried out. Then, the engine torque increases. However, the part of the engine torque that exceeds the required torque is absorbed through the regenerative control in the second motor generator 5, and the battery 26 is charged therewith within the range of the input limit Win. Then, the generation of the surplus torque is avoided, and thus the switching from the lean combustion mode to the stoichiometric combustion mode is completed at time t13 with the shock to the vehicle 1 suppressed.

Figure 5:
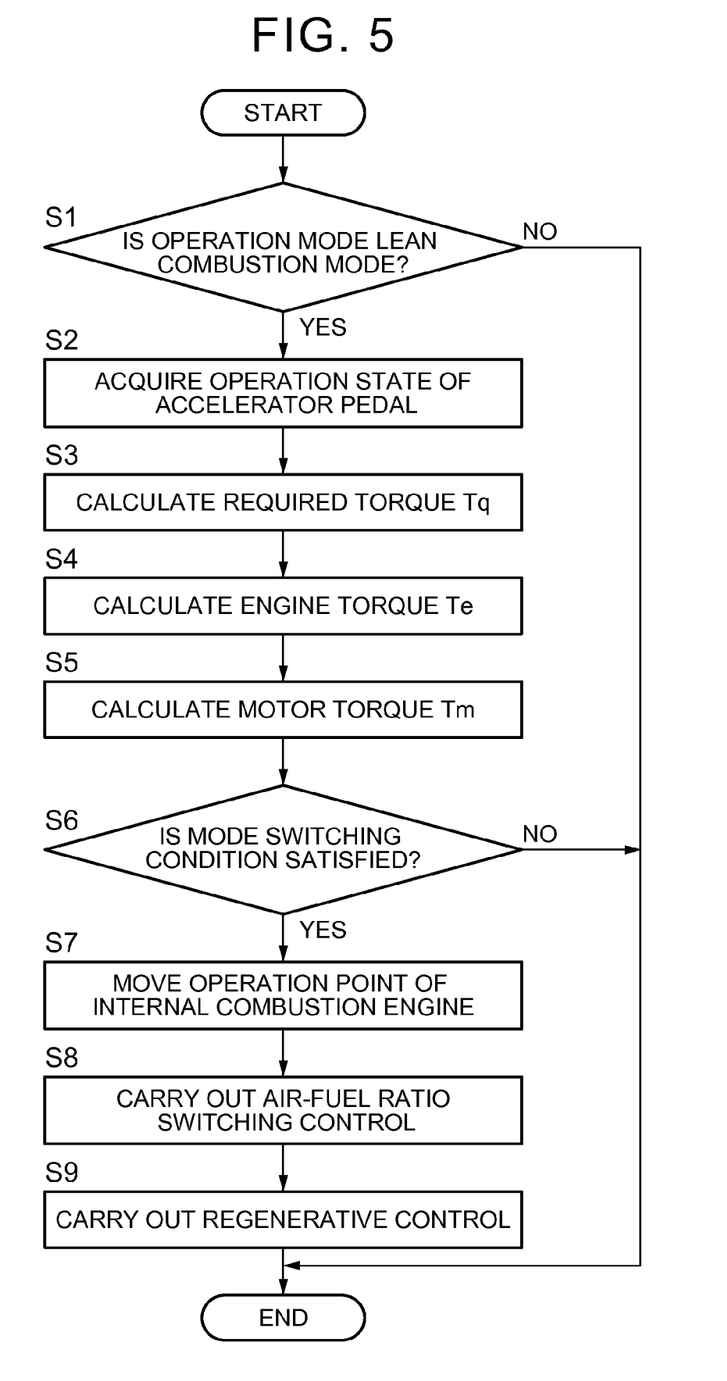
FIG. 5 is a flowchart illustrating an example of a control routine according to the first embodiment.

Hereinafter, an example of a control routine that the ECU 30 carries out so as to realize the above-described control will be described with reference to FIG. 5. A program for the control routine illustrated in FIG. 5 is stored in the ECU 30 and is repeatedly executed at predetermined intervals after being read at an opportune time.

In Step S1, the ECU 30 determines whether or not the operation mode is the lean combustion mode. In a case where the operation mode is the lean combustion mode, the processing proceeds to Step S2. Otherwise, the current routine is terminated with the following processing skipped. In Step S2, the ECU 30 acquires an operation state of the accelerator pedal 28 with reference to the signal of the accelerator opening degree sensor 31. The ECU 30 acquires each of the depression rate and the depression amount of the accelerator pedal 28 as the operation states of the accelerator pedal 28.

In Step S3, the ECU 30 calculates the required torque Tq based on the depression amount (accelerator opening degree) of the accelerator pedal 28 acquired in Step S2 and a vehicle speed obtained from the vehicle speed sensor 32. The required torque Tq is calculated based on a calculation map that is prepared in advance and stored in the ECU 30. In Step S4, the ECU 30 calculates the engine torque Te. The engine torque Te is calculated based on the normal line La (FIG. 2) described above and the engine rotational speed. In Step S5, the ECU 30 calculates the motor torque Tm based on the required torque Tq and the engine torque Te. Then, the distribution of the engine torque Te and the motor torque Tm with respect to the required torque Tq is determined.

In Step S6, the ECU 30 determines whether or not the operation mode of the internal combustion engine 3 should be switched from the lean combustion mode to the stoichiometric combustion mode based on whether or not a mode switching condition is satisfied. The mode switching condition is set based on the operation state of the accelerator pedal 28 acquired in Step S2. Specifically, the mode switching condition is satisfied in a case where the depression rate of the accelerator pedal 28 exceeds a predetermined value and the depression amount of the accelerator pedal 28 exceeds a predetermined value. In a case where the mode switching condition is satisfied, it is determined that the operation mode should be switched. In a case where the mode switching condition is satisfied, the processing proceeds to Step S7. In a case where the mode switching condition is not satisfied, the current routine is terminated with the following processing skipped.

In Step S7, the ECU 30 moves the operation point of the internal combustion engine 3 toward the low torque side. The internal combustion engine 3 is connected to the first motor generator 4 via the power dividing mechanism 6 and is capable of differential rotation with the first motor generator 4, and thus the ECU 30 moves the operation point of the internal combustion engine 3 by performing torque control on the first motor generator 4. The ECU 30 calculates the regeneratable torque Tlim from the above-described conditions such as the electric power storage rate of the battery 26 and calculates the engine torque based on Equation 4 above. Then, the ECU 30 reduces the distribution of the engine torque with respect to the required torque by moving the operation point of the internal combustion engine 3 along the equal power line Lp (refer to FIG. 2) until the calculated engine torque is reached. In tandem with the movement of the operation point of the internal combustion engine 3, the ECU 30 increases the motor torque of the second motor generator 5 for the balance with the reduction in the distribution of the engine torque with respect to the required torque. The ECU 30 functions as the torque control means according to the invention by executing Step S7.

In Step S8, the ECU 30 carries out the air-fuel ratio switching control for reducing the air-fuel ratio based on an increase in the fuel injection quantity regarding the internal combustion engine 3. The ECU 30 functions as the air-fuel ratio control means according to the invention by executing Step S8. In Step S9, the ECU 30 carries out the regenerative control in the second motor generator 5 so as to absorb the engine torque increased by the air-fuel ratio switching control and exceeding the required torque. This regenerative control is carried out with the regenerative torque that is limited by the regeneratable torque Tlim.

When the ECU 30 carries out the control routine that is illustrated in FIG. 5, the generation of the surplus torque is avoided as described above and the shock to the vehicle 1 can be suppressed. In Step S7, the engine power can be maintained during the movement of the operation point since the operation point of the internal combustion engine 3 is moved along the equal power line Lp. Accordingly, the excess and deficiency of the power of the internal combustion engine 3 can be avoided during the movement of the operation point.

(Second Embodiment)

Hereinafter, a second embodiment of the invention will be described with reference to FIGS. 6 and 7. The second embodiment is identical to the first embodiment except for the control that is carried out by the ECU 30. FIG. 1 is referred to with regard to a physical configuration of the vehicle 1. In this embodiment, the ECU 30 reduces the distribution of the engine torque with respect to the required torque as in the first embodiment and performs a rich spike for purifying the nitrogen oxide occluded in the NOx catalyst 16 while the lean combustion mode is carried out.

Figure 6:
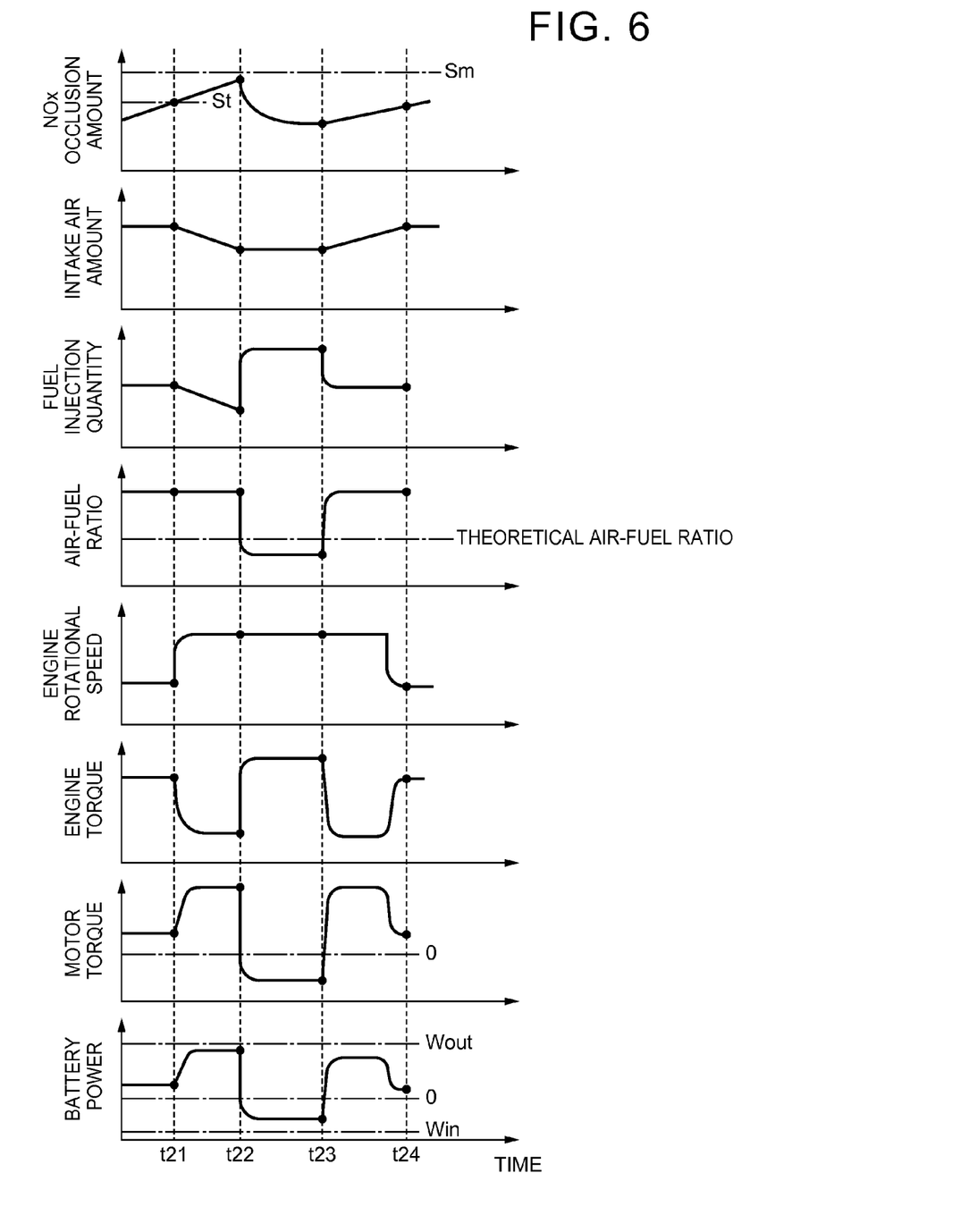
FIG. 6 is a time chart pertaining to a case where control according to a second embodiment is carried out.

As illustrated in FIG. 6, for example, the ECU 30 determines that the rich spike should be carried out in a case where the NOx occlusion amount of the NOx catalyst 16 reaches a predetermined value St, at which the rich spike should be carried out, at time t21 while the internal combustion engine 3 is in operation in the lean combustion mode. The rich spike is to temporarily change the air-fuel ratio to the air-fuel ratio on the rich side while the lean combustion mode is carried out, and thus the rich spike corresponds to the non-lean combustion mode. Accordingly, a case where the NOx occlusion amount reaches the predetermined value St at which the rich spike should be carried out corresponds to a case where the operation mode of the internal combustion engine 3 should be switched from the lean combustion mode to the non-lean combustion mode. The predetermined value St described above is set to a low value that has at least some margin in comparison to an occlusion limit value Sm of the NOx catalyst 16.

In a case where it is determined that the rich spike should be carried out, the ECU 30 calculates the engine torque for reducing the distribution of the engine torque with respect to the required torque based on Equation 4 above. Herein, a target air-fuel ratio at rich spike $\lambda 3(\lambda 2 > \lambda 3)$ is used in Equation 4 instead of the target air-fuel ratio $\lambda 2$ of the stoichiometric combustion mode. Then, the operation point of the internal combustion engine 3 is moved along the equal power line Lp (FIG. 2) from the operation point pertaining to time t21 to the operation point of the engine torque calculated based on Equation 4. Since the operation point of the internal combustion engine 3 is moved along the equal power line Lp, the engine rotational speed changes toward the high rotation side and the engine torque changes toward the low torque side from time t21. When the operation point changes as described above, each of the intake air amount and the fuel injection quantity is reduced. In this case, the motor torque increases to be balanced with the reduction in the distribution of the engine torque with respect to the required torque. The electric power consumption increases as a result of the increase in the motor torque, and thus the input and output of the battery (battery power) increases within the range of the output limit Wout.

Upon the internal combustion engine 3 reaching the operation point of the engine torque calculated based on Equation 4 at time t22, the rich spike is carried out as the air-fuel ratio switching control. Then, the engine torque increases. However, the part of the increased engine torque that exceeds the required torque is absorbed through the regenerative control in the second motor generator 5, and the battery 26 is charged therewith within the range of the input limit Win. Then, the fuel injection quantity is decreased at time t23 so that the air-fuel ratio returns to the air-fuel ratio of the lean combustion mode. The reduction in the engine torque resulting from the decrease in the fuel injection quantity is compensated for by an increase in the motor torque of the second motor generator. At time t24, the operation mode of the internal combustion engine 3 returns to the lean combustion mode and the rich spike is completed.

Hereinafter, an example of a control routine that the ECU 30 carries out so as to realize the above-described control will be described with reference to FIG. 7. A program for the control routine illustrated in FIG. 7 is stored in the ECU 30 and is repeatedly executed at predetermined intervals after being read at an opportune time. Step S11 to Step S15 are equivalent to Step S1 to Step S5 of the control routine (FIG. 5) according to the first embodiment. In other words, the ECU 30 determines in Step S11 whether or not the operation mode is the lean combustion mode. In a case where the operation mode is the lean combustion mode, the processing proceeds to Step S12. Otherwise, the current routine is terminated with the following processing skipped. In Step S12, the ECU 30 acquires the operation state of the accelerator pedal 28 with reference to the signal of the accelerator opening degree sensor 31. In Step S13, the ECU 30 calculates the required torque Tq based on the accelerator opening degree and the vehicle speed. In Step S14, the ECU 30 calculates the engine torque Te. In Step S15, the ECU 30 calculates the motor torque Tm based on the required torque Tq and the engine torque Te. Then, the distribution of the engine torque Te and the motor torque Tm with respect to the required torque Tq is determined In Step S16, the ECU 30 acquires the temperature of the NOx catalyst 16 with reference to a signal of the temperature sensor 18. In Step S17, the ECU 30 estimates the NOx occlusion amount S of the NOx catalyst 16. The estimation of the NOx occlusion amount S can be carried out by a known method. For example, the ECU 30 calculates the total flow rate of the exhaust gas pertaining to a period in which the lean combustion mode is carried out after the rich spike is carried out and estimates the NOx occlusion amount based on the total flow rate and the temperature of the NOx catalyst 16 acquired in Step S16.

In Step S18, the ECU 30 determines whether or not the NOx occlusion amount S amounts to the above-described predetermined value St at which the rich spike should be carried out, that is, whether or not the NOx occlusion amount S is at least the predetermined value St. In a case where the NOx occlusion amount S amounts to the predetermined value St, the processing proceeds to Step S19. Otherwise, the current routine is terminated with the following processing skipped.

In Step S19, the ECU 30 moves the operation point of the internal combustion engine 3 by performing torque control on the first motor generator 4. The ECU 30 calculates the regeneratable torque Tlim from the above-described conditions such as the electric power storage rate of the battery 26 and calculates the engine torque based on Equation 4 above. Then, the operation point of the internal combustion engine 3 is moved along the equal power line Lp (refer to FIG. 2) until the calculated engine torque is reached. Then, the distribution of the engine torque with respect to the required torque is reduced. In tandem with the movement of the operation point of the internal combustion engine 3, the ECU 30 increases the motor torque of the second motor generator 5 for the balance with the reduction in the distribution of the engine torque with respect to the required torque. The ECU 30 functions as the torque control means according to the invention by executing Step S19.

In Step S20, the ECU 30 carries out the rich spike as the air-fuel ratio switching control. The ECU 30 functions as the air-fuel ratio control means according to the invention by executing Step S20. In Step S21, the ECU 30 carries out the regenerative control in the second motor generator 5 so as to absorb the engine torque increased by the rich spike and exceeding the required torque. This regenerative control is carried out with the regenerative torque that is limited by the regeneratable torque Tlim.

Figure 7:
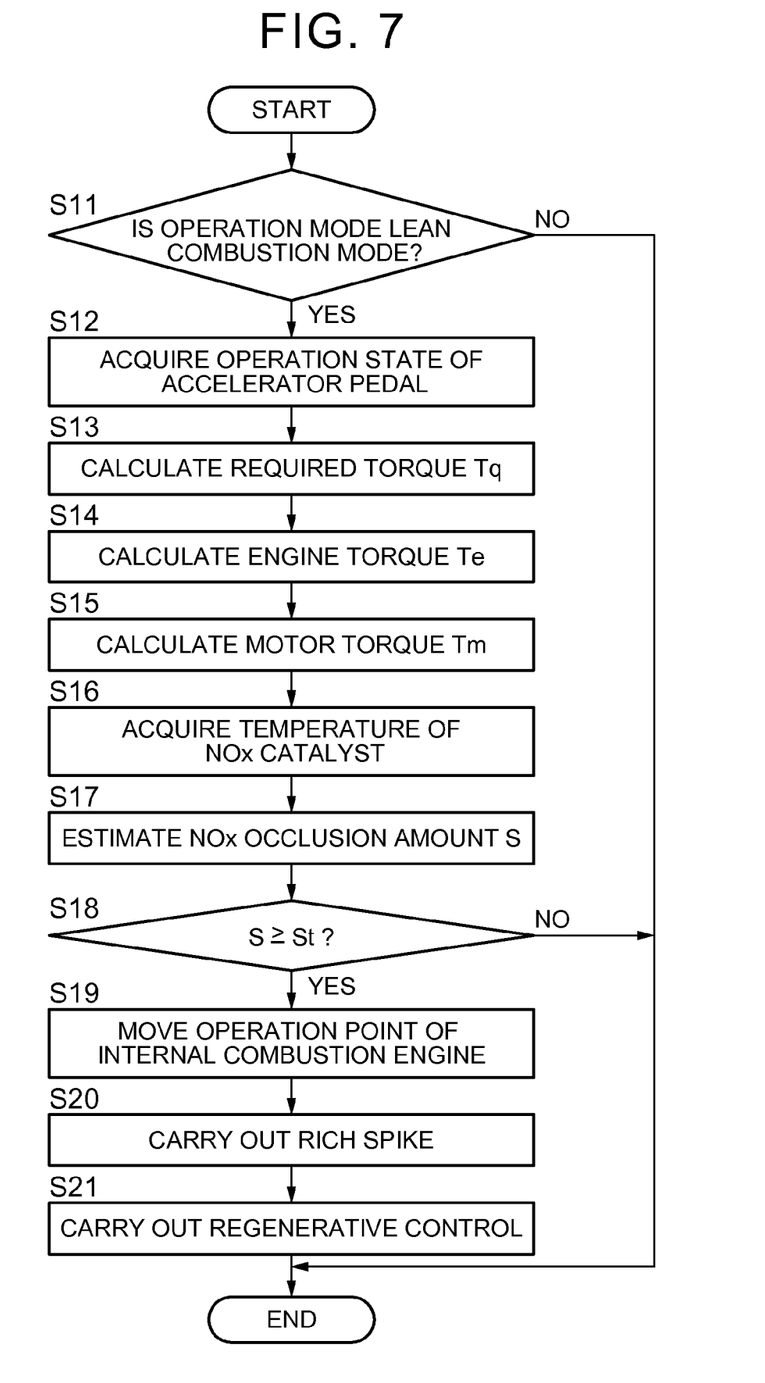
FIG. 7 is a flowchart illustrating an example of a control routine according to the second embodiment.

When the ECU 30 carries out the control routine that is illustrated in FIG. 7, the generation of the surplus torque resulting from the rich spike is avoided as described above and the shock to the vehicle 1 can be suppressed. In Step S19, the engine power can be maintained during the movement of the operation point since the operation point of the internal combustion engine 3 is moved along the equal power line Lp. Accordingly, the excess and deficiency of the power of the internal combustion engine 3 can be avoided during the movement of the operation point. The control according to the second embodiment can be carried out in combination with the control according to the first embodiment. In this case, the shock to the vehicle 1 can be suppressed during both the switching from the lean combustion mode to the stoichiometric combustion mode and the rich spike.

(Third Embodiment)

Figure 8:
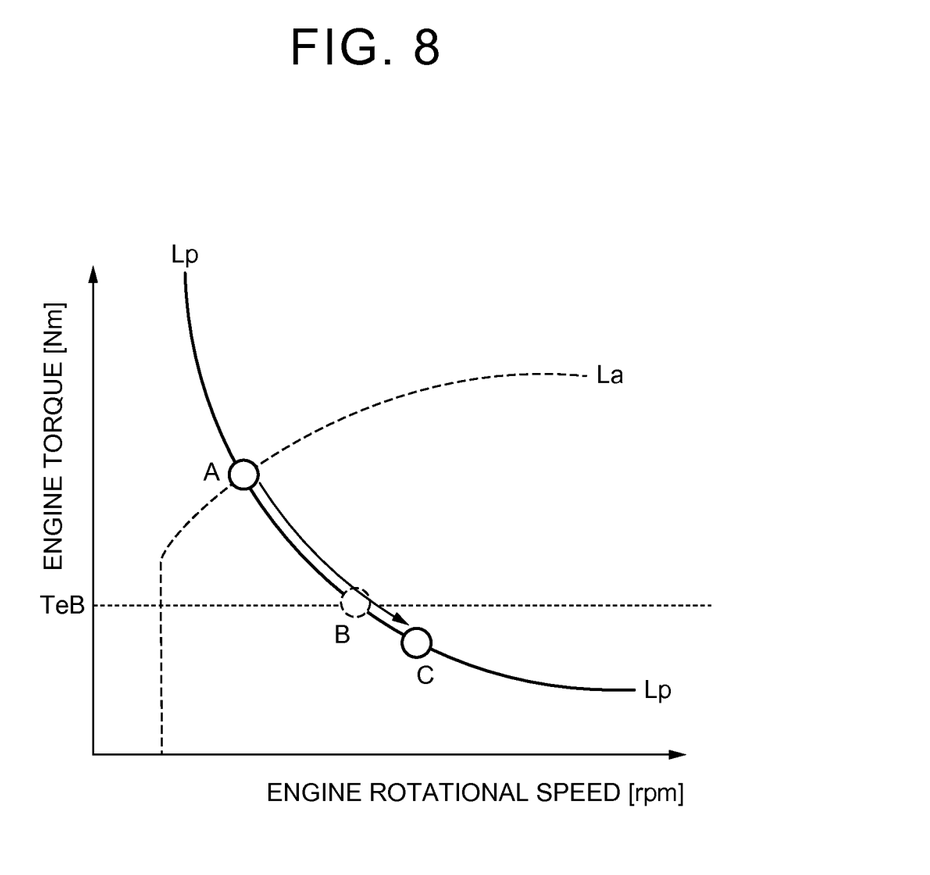
FIG. 8 is an explanatory drawing illustrating control content according to a third embodiment.

Hereinafter, a third embodiment of the invention will be described with reference to FIGS. 8 and 9. Control according to the third embodiment is carried out in combination with the control according to the first embodiment or the second embodiment described above. In the first and second embodiments, the engine torque is calculated based on Equation 4 above in Step S7 in FIG. 5 and in Step S19 in FIG. 7 and the operation point of the internal combustion engine 3 is moved to the operation point of the engine torque. In the third embodiment, however, the operation point of the internal combustion engine 3 is moved to an operation point C with the highest thermal efficiency, with the power remaining equal, when a region where the thermal efficiency is improved is present on the low torque side in comparison the operation point B of the engine torque calculated based on Equation 4 above in a case where the operation mode should be switched from the lean combustion mode to the stoichiometric combustion mode or in a case where the rich spike should be carried out.

Figure 9:
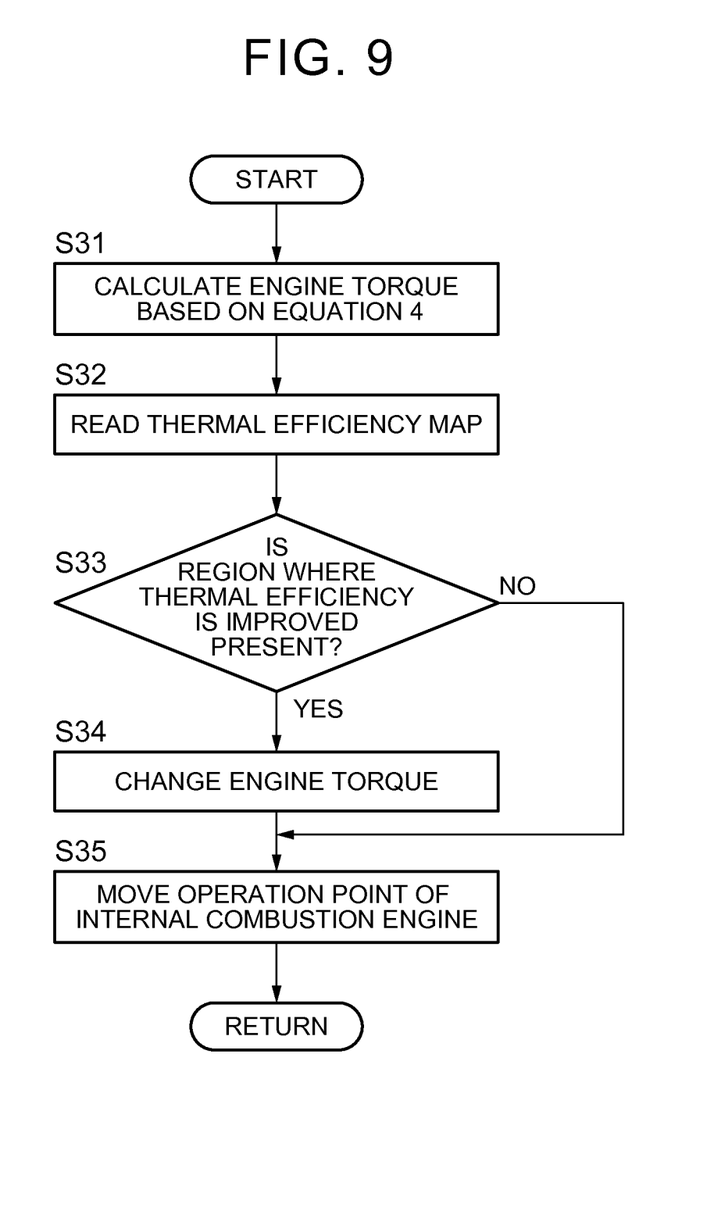
FIG. 9 is a flowchart illustrating an example of a control routine according to the third embodiment.

The control routine that is illustrated in FIG. 9 is incorporated into Step S7 in FIG. 5 or Step S19 in FIG. 7 and is carried out as a subroutine of the control routine illustrated in FIG. 5 or FIG. 9. In this case, the ECU 30 functions as the torque changing means according to the invention.

As illustrated in FIG. 9, the ECU 30 calculates the engine torque in Step S31 based on Equation 4 above. In Step S32, the ECU 30 reads a thermal efficiency map in which the operation point and the thermal efficiency of the internal combustion engine 3 are associated with each other. In Step S33, the ECU 30 determines whether or not the region where the thermal efficiency of the internal combustion engine 3 is improved is present on the low torque side in comparison to the operation point of the engine torque calculated in Step S31 with reference to the thermal efficiency map read in Step S32. The processing proceeds to Step S34 in a case where the region is present. Otherwise, the processing proceeds to Step S35 with Step S34 skipped.

In Step S34, the ECU 30 changes the engine torque toward the low torque side. In this embodiment, the engine torque is changed into the engine torque equal in power to the operation point of the engine torque calculated in Step S31 and pertaining to the operation point with the highest thermal efficiency among the operation points on the low torque side with high thermal efficiency. In other words, the engine torque calculated in Step S31 is changed into a low value in a case where the operation point that provides the highest thermal efficiency is present.

In Step S35, the ECU 30 moves the operation point of the internal combustion engine 3 by performing torque control on the first motor generator 4. In other words, the operation point of the internal combustion engine 3 is moved along the equal power line Lp (refer to FIG. 2) until the engine torque calculated in Step S31 or the engine torque changed through Step S34 is reached. Then, the distribution of the engine torque with respect to the required torque is reduced. In tandem with the movement of the operation point of the internal combustion engine 3, the ECU 30 increases the motor torque of the second motor generator 5 for the balance with the reduction in the distribution of the engine torque with respect to the required torque.

According to the control routine that is illustrated in FIG. 9, the engine torque is changed into a low value in a case where the thermal efficiency of the internal combustion engine 3 is improved in comparison to the engine torque calculated based on Equation 4. Accordingly, the surplus torque that results from the switching of the operation modes can be reliably absorbed while deterioration in the fuel economy of the internal combustion engine 3 is suppressed.

The invention is not limited to the embodiments described above and can be realized in various forms without departing from the scope of the invention. In each of the embodiments described above, the engine torque is changed toward the low torque side with the equal power being maintained in a case where the operation mode should be switched from the lean combustion mode to the stoichiometric combustion mode or in a case where the rich spike should be carried out, that is, in a case where the operation mode should be switched from the lean combustion mode to the non-lean combustion mode. According to the invention, however, the maintenance of the equal power is optional when the engine torque is changed toward the low torque side. In a case where the operation mode should be switched from the lean combustion mode to the non-lean combustion mode, for example, the invention can be realized in the form of the engine torque being changed toward the low torque side with the engine rotational speed being constant. Even in this case, an increase in the engine torque resulting from the air-fuel ratio switching control can be suppressed, and thus the shock to the vehicle can be suppressed.

In each of the embodiments described above, the amount by which the engine torque exceeds the required torque corresponds to the regeneratable torque (refer to FIG. 3) since the distribution of the engine torque with respect to the required torque is reduced with the engine torque calculated based on Equation 4 above. In this case, the generation of the surplus torque can be effectively avoided. However, the rate at which the distribution of the engine torque with respect to the required torque is reduced may be appropriately set insofar as the shock to the vehicle can be suppressed. For example, the distribution of the engine torque with respect to the required torque can also be reduced at a constant rate of reduction according to this embodiment. Even in this case, the generation of the surplus torque can be completely avoided insofar as the regeneratable torque exceeds the excess amount of the engine torque. Even in a case where the excess amount exceeds the regeneratable torque and the surplus torque is generated, the surplus torque can be reduced in comparison to a case where the distribution of the engine torque is not reduced. Accordingly, the shock to the vehicle can be suppressed.

Each of the embodiments described above relates to a control device that is applied to a hybrid vehicle which is provided with a first motor generator and a second motor generator. However, the control device according to the invention can also be applied to a hybrid vehicle in which, for example, a single motor generator is connected to output members, such as an output gear and an output shaft, to which engine torque is transmitted.

The invention claimed is:

1. A control device for a hybrid vehicle including an internal combustion engine and at least one motor generator as power sources for traveling, the internal combustion engine capable of switching operation modes between a lean combustion mode and a non-lean combustion mode set to an air-fuel ratio on a rich side in comparison to the lean combustion mode, the control device comprising:
an electronic control unit, the electronic control unit configured to:
change a distribution of engine torque of the internal combustion engine and motor torque of the at least one motor generator with respect to required torque; and
carry out air-fuel ratio switching control for reducing the air-fuel ratio of the internal combustion engine in a case where the operation mode is switched from the lean combustion mode to the non-lean combustion mode,
wherein the electronic control unit carries out the air-fuel ratio switching control after the electronic control unit reduces the distribution of the engine torque with respect to the required torque in a case where the operation mode is switched from the lean combustion mode to the non-lean combustion mode,
wherein the electronic control unit reduces the distribution of the engine torque with respect to the required torque by calculating the engine torque based on a first target air-fuel ratio in the lean combustion mode, a second target air-fuel ratio in the non-lean combustion mode, the required torque, and regeneratable torque regeneratable in the motor generator.

2. The control device according to claim 1, wherein the electronic control unit is further configured to change the engine torque into a low value in a case where a region where thermal efficiency of the internal combustion engine is improved on a low torque side in comparison to the engine torque calculated by the electronic torque control unit.

3. The control device according to claim 1, wherein the electronic control unit reduces the distribution of the engine torque with respect to the required torque in a state where the internal combustion engine is maintained at equal power.

4. A control device for a hybrid vehicle including an internal combustion engine and at least one motor generator as power sources for traveling, the internal combustion engine capable of carrying out a lean combustion mode and capable of carrying out a rich spike for temporarily changing an air-fuel ratio into an air-fuel ratio on a rich side when the lean combustion mode is carried out, the control device comprising:
an electronic control unit, the electronic control unit configured to:
change a distribution of engine torque of the internal combustion engine and motor torque of the at least one motor generator with respect to required torque; and
carry out air-fuel ratio switching control for reducing the air-fuel ratio of the internal combustion engine in a case where the rich spike is carried out,
wherein electronic control unit carries out the air-fuel ratio switching control after the electronic control unit reduces the distribution of the engine torque with respect to the required torque in a case where the rich spike is carried out,
wherein the electronic control unit reduces the distribution of the engine torque with respect to the required torque by calculating the engine torque based on a first target air-fuel ratio in the lean combustion mode, a second target air-fuel ratio during the rich spike, the required torque, and regeneratable torque regeneratable in the motor generator.

* * * * *

UNITED STATES PATENT AND TRADEMARK OFFICE
CERTIFICATE OF CORRECTION

PATENT NO. : 9,527,497 B2
APPLICATION NO. : 14/894630
DATED : December 27, 2016
INVENTOR(S) : Hiroki Morita et al.

It is certified that error appears in the above-identified patent and that said Letters Patent is hereby corrected as shown below:

In the Claims

Column 14, Line 46, Claim 4 change the content from:
"wherein electronic"
To:
"wherein the electronic"

Signed and Sealed this
Fifth Day of June, 2018

Andrei Iancu
*Director of the United States Patent and Trademark Office*